(12) United States Patent  
Schmidt

(10) Patent No.: US 6,229,920 B1  
(45) Date of Patent: *May 8, 2001

(54) METHOD OF CLASSIFYING AND RECOGNIZING PATTERNS BY ADDITIVE CONTOUR EXTRACTION AND AVERAGING

(75) Inventor: Guenter Schmidt, Unterhaching (DE)

(73) Assignee: Delphi Systemsimulation GmbH, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,748

(22) PCT Filed: Apr. 24, 1997

(86) PCT No.: PCT/DE97/00836

§ 371 Date: Mar. 5, 1998

§ 102(e) Date: Mar. 5, 1998

(87) PCT Pub. No.: WO97/41529

PCT Pub. Date: Nov. 6, 1997

(30) Foreign Application Priority Data

Apr. 25, 1996 (DE) .............................................. 196 16 565

(51) Int. Cl.$^7$ ................................ G06K 9/48; G06K 9/46
(52) U.S. Cl. ............................................ 382/198; 382/203
(58) Field of Search .................................. 382/197, 198, 382/199, 200, 249, 224, 209, 201, 215, 264, 269, 203

(56) References Cited

U.S. PATENT DOCUMENTS

| | | | |
|---|---|---|---|
| 3,942,169 | * | 3/1976 | Fujimoto et al. ................... 340/146.3 |
| 4,317,109 | * | 2/1982 | Odaka et al. ...................... 340/146.3 |
| 4,365,235 | * | 12/1982 | Greanias et al. .................. 340/146.3 |
| 4,542,412 | * | 9/1985 | Fuse ................................... 358/260 |
| 4,653,107 | * | 3/1987 | Shijoma et al. ........................ 382/13 |
| 4,703,363 | * | 10/1987 | Kitamura .............................. 358/284 |
| 4,748,675 | * | 5/1988 | Suzuki et al. ........................... 382/21 |
| 4,760,605 | * | 7/1988 | David et al. ............................ 382/47 |
| 4,791,679 | * | 12/1988 | Barski et al. ............................ 382/55 |

(List continued on next page.)

OTHER PUBLICATIONS

Kass, M., Witkin, A., Terzopoulos, D., Snakes: Avtive Contour Models, International Journal of Computer Vision, pp. 321–331.*

Jia–Guu Leu, Pattern Recognition, vol. 24, No. 10, pp. 949–957, "Computing A Shape's Moments From Its Boundary", Jan. 1, 1991.

Primary Examiner—Amelia Au  
Assistant Examiner—Martin Miller  
(74) Attorney, Agent, or Firm—Oblon, Spivak, McClelland, Maier & Neustadt, P.C.

(57) ABSTRACT

A method for classifying and recognizing patterns which includes producing a pattern to be classified and recognized of an m-dimensional object. The object to be classified and recognized is provided in the form of an m-dimensional traverse. The method also acquires a property represented by an s-dimensional value for selected points of the traverse, whereby the s-dimensional value reflects a relationship between a respective selected point and a point preceding it and a point succeeding it on the traverse, links the s-dimensional values for the selected points of the traverse in such a manner that an overall property represented by a q-dimensional value characterizing the traverse is obtained, and smooths the traverse in order to form a new traverse. Further, the method (k−1) times repeats steps (b) to (d) (wherein k is an integer) to thereby obtain k overall properties from the repetition of step (c), generates a q×k-dimensional matrix for the pattern by utilizing the k overall properties, and compares the signature of the pattern to signatures of known patterns for ascertaining a degree of similarity of compared signatures.

14 Claims, 4 Drawing Sheets

ORIGINAL

STEP 1

STEP 2

STEP 3

U.S. PATENT DOCUMENTS

| | | | |
|---|---|---|---|
| 5,036,544 | * 7/1991 | Sakaue et al. | 382/24 |
| 5,050,227 | * 9/1991 | Furusawa et al. | 382/54 |
| 5,150,431 | * 9/1992 | Yoshida et al. | 382/56 |
| 5,218,649 | * 6/1993 | Kundu et al. | 382/54 |
| 5,345,547 | * 9/1994 | Anezaki et al. | 395/143 |
| 5,448,653 | * 9/1995 | Hori et al. | 382/202 |
| 5,598,215 | * 1/1997 | Watanabe | 348/416 |
| 5,617,486 | * 4/1997 | Chow et al. | 382/181 |
| 5,706,419 | * 1/1998 | Matsugu et al. | 395/135 |
| 5,740,273 | * 4/1998 | Parthasarathy et al. | 382/187 |

* cited by examiner

ORIGINAL

STEP 1

STEP 2

STEP 3

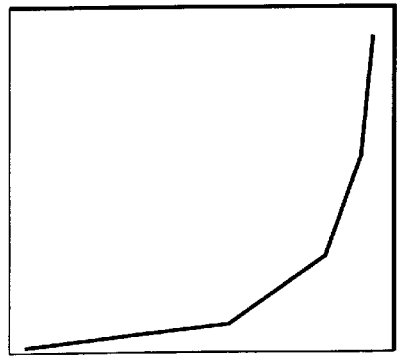
FIG. 4A "FRACTAL"
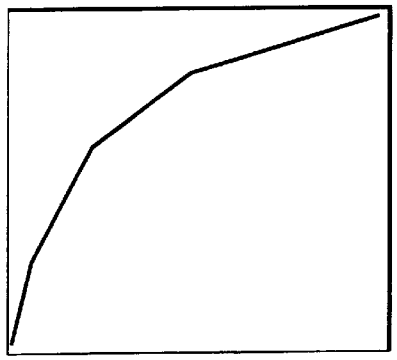
FIG. 4B "SMOOTH"
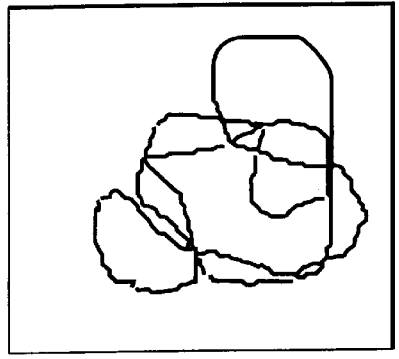
FIG. 3A PATTERN
FIG. 3B METHOD OF CLASSIFYING AND RECOGNIZING PATTERNS BY ADDITIVE CONTOUR EXTRACTION AND AVERAGING

BACKGROUND OF THE INVENTION

1. Field of the Invention

The present invention concerns a method for classifying and recognizing patterns and in particular a method whereby a pattern may be classified by utilizing a classification vector which differs depending on a degree of fractality of the respective pattern.

2. Discussion of the Background

Pattern recognition constitutes a central problem in many technical fields. Such pattern recognition should make it possible to acquire m-dimensional objects by using data processing means in such a manner that the data processing means is enabled to determine at maximum possible accuracy to which m-dimensional object the respective pattern should be assigned. Highly precise pattern recognition of m-dimensional objects would, for example, permit automatic navigation of any kind of vehicles to thus prevent accidents brought about by human error as far as possible. It would furthermore be possible to automatically and highly accurately identify the handwriting of any person. In the same manner, production of automatic machines or robots equipped with an intelligent sensory mechanism would not constitute a problem with highly accurate pattern recognition. Further fields of application are e.g. in the recognition of contour lines provided in the form of red-green-blue color data, of a symbol in symbol input via a pressure-sensitive digitising tablet, or of monaural audio data etc. Many other applications are equally conceivable.

Many methods for pattern recognition are already known in the prior art. A drawback of each known method does, however, reside in the fact that they are only applicable to specific kinds of objects. Universal applicability of these known methods is consequently strongly limited. It is another drawback of the known methods that in particular reliable recognition of highly complex structures or fractal structures will either fail or only succeed at extremely high computing speeds, such that real-time pattern recognition will not be possible.

In pattern recognition it is frequently also necessary to disregard certain features of the object or to only consider them in such a way that the actual measure reflecting a feature will become irrelevant. Thus it is conceivable e.g. that the actual spatial extension of an object should be irrelevant to thereby make it possible that objects merely differing in their spatial size are recognized to be similar.

SUMMARY OF THE INVENTION

It is therefore the object of the present invention to furnish a method for classifying and recognizing patterns which is applicable to any type of object and which classifies and recognises patterns on the basis of a classification vector which differs in accordance with the degree of fractality of the object.

Thus object is attained by the measures indicated in the claims.

Further advantageous embodiments of the present invention result from the subclaims.

In particular, in accordance with the method according to the claims a pattern of an m-dimensional object to be classified and recognised and having the form of an m-dimensional traverse is established. For each point of this traverse a property is detected which unambiguously reflects a relationship of a respective point of the traverse with the point preceding it and the point succeeding it. These properties for each point are linked in order to obtain an overall property unambiguously characterising the traverse. Subsequently the traverse is smoothed. After this, the steps of acquiring, linking and smoothing are repeated (k–1) times, with k representing an integer. By using the obtained overall properties present in the number k, a signature is generated for the pattern. This signature is used for comparison with signatures of known patterns in order to ascertain a degree of similarity between the compared signatures.

By means of this method it is possible in a simple manner to classify a pattern of any m-dimensional object on the basis of the degree of fractality of the pattern not only be means of a dimension of fractality but a whole set of numbers, i.e. a vector comprising k components. If the traverse utilized in the method comprises n points, the pattern comprising n points and the dimension m is consequently classified by a vector having k components, thereby enabling more rapid and more data-extensive comparison. As the method is not subject of any dimensional restrictions, it may furthermore be applied to any desired objects. By making appropriate use of various conditions or demands in acquisition of the properties and smoothing of the traverse, the method may be modified such as to disregard certain characteristics of the pattern to be classified and recognized, or for instance only considers them in such a manner that differences of scale between the pattern to be classified and recognized and the pattern of a known object are not taken into account. This means that the method may be modified to adapt to any conceivable application.

BRIEF DESCRIPTION OF THE DRAWINGS

The invention will be explained below in more detail by way of the description of embodiments while making reference to the drawings, wherein:

FIGS. 3(a) and 3(b) are representations of patterns having different degrees of complexity or fractality to elucidate the manner of functioning of the method in accordance with the first embodiment of the present invention;

FIGS. 4(a) and 4(b) are representations of the signature of the pattern shown in FIGS. 3(a) and 3(b), respectively, to elucidate the manner of functioning of the first embodiment of the present invention;

DESCRIPTION OF THE PREFERRED EMBODIMENTS

In the following a first embodiment of the present invention will be described.

The first embodiment of the present invention explains the manner of functioning of the method of the present invention by means of a two-dimensional traverse contained in a plane. It should, however, be noted that the method is not restricted thereto; it is rather one advantage of the method of the invention that it may be applied to any desired m-dimensional traverse ($1<m<\infty$).

The first embodiment of the invention shall be explained by referring to FIGS. 1(a) to 1(d) and 2.

Figure 1A:
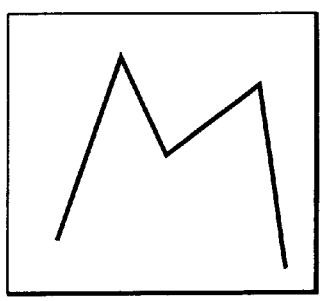
FIGS. 1(a) to 1(d) show a representation of smoothing a traverse in accordance with a first embodiment of the invention.
Figure 1B:
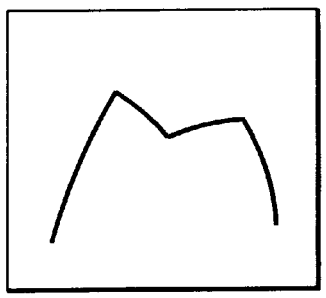
Figure 1C:
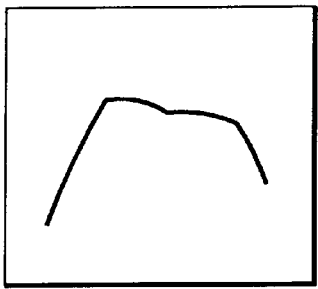
Figure 1D:
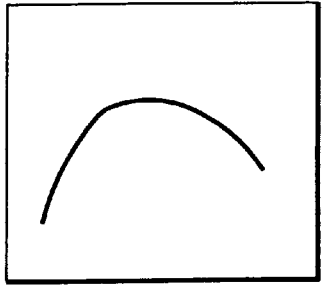

At the outset, an m-dimensional traverse is generated by a method known per se from any desired m-dimensional structure (with m=2 in this embodiment). Referring to FIG. 1(a), the two-dimensional traverse in this embodiment consists to the letter "M". Subsequently a desired property of the traverse is acquired. The desired property to be acquired with respect to the letter "M" can, for example, be a measure of length. Consequently a measure of length is defined for each point of the traverse in such a manner that it unambiguously reflects a relationship between the point preceding the respective point, the respective point, and the point succeeding the respective point. In the case of this embodiment the measure of length of the respective point is determined such that each point is assigned half the distance separating it from its predecessor and half the distance separating it from is successor, i.e. the Euclidean length. This is performed for every point of the traverse. The measures of length acquired in this manner are linked to form an overall measure of length which is characteristic of the traverse. In the case of this embodiment the overall measure of length is determine from an addition of the measures of length acquired for every point.

Subsequently so-called smoothing of the traverse is performed. In the present case this means that from at least the co-ordinates of the point preceding a respective point, of the respective point, and of the point succeeding the respective point on the traverse a new point is determined. This is in turn performed for every point of the traverse, resulting in a new traverse $P_1$. Determination of the new traverse $P_1$ may e.g. be performed by means of the following equation:

$$r_1(k)=\{r_0(k-1)+2r_0(k)+r_0(k+1)\}/4 \quad (1)$$

In the above equation (1), $r_1(k)$ designates the co-ordinate of the point of the new traverse $P_1$, $r_0(k-1)$ designates the co-ordinate of the point preceding the respective point on the previous traverse $P_0$, and $r_0(k+1)$ designates the co-ordinate of the point succeeding the respective point on the previous traverse $P_0$.

Figure 2:
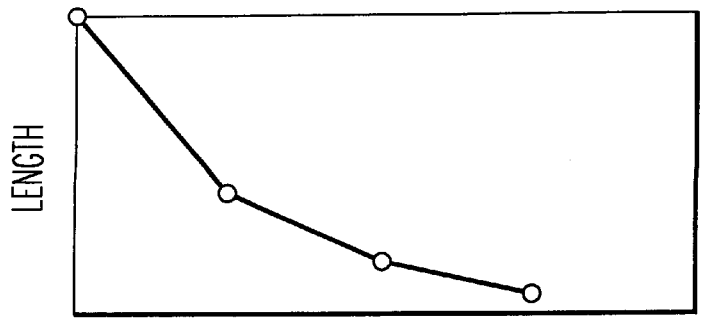
FIG. 2 is a graphic representation of a modification of length in accordance with repeated smoothing steps in accordance with the first embodiment of the present invention.

If the above equation (1) is applied to each point of the previous traverse $P_0$, this results in the new traverse $P_1$. Subsequently the above named steps, starting from acquiring the desired properties, are repeated for each point of the traverse. Any desired number of such passes may be performed. In case k-1 passes are performed, this therefore results in k overall properties, with a respective overall property being assigned to a respective traverse $P_0$ to $P_{k-1}$. There accordingly results a vector having k components, which represents a signature of the object or pattern represented by the original traverse. In FIGS. 1(a) to 1(d) the above described method has been performed for three smoothing steps (k=0 to 3). For each pass there thus results an overall property which in this case constitutes a length. In FIG. 2 the four overall properties obtained form FIGS. 1(a) to 1(d) are plotted over the number of steps. The representation shown in FIG. 2 constitutes the signature for the letter "M" which in this case represents the object or pattern to be classified and recognised. This signature is compared to signatures of known patterns to thus ascertain a degree of similarity between the compared signatures. Thus the signature may be used to identify the original object or pattern.

It is furthermore possible to normalize the obtained overall properties to the overall property of the original traverse $P_0$. In this case objects or patterns differing in size only are recognized to be similar. This means that in the case of this embodiment an object to be classified and recognised having the shape of the letter "M" is recognised to be similar to a known object having the shape of the letter "M" which is smaller or larger by any factor than the object to be classified and recognized, i.e. the two objects are different in scale.

It is obvious that the above described method is applicable to any object of any dimension. Thus the dimensions may e.g. be amplitude and time in monaural audio date ($m=1+1=2$), location and color in contour lines of objects of red-green-blue data ($m$=location+color=2+3), or location, time, pen, contact pressure in symbol input on a pressure-sensitive digitising tablet ($m=2+1+1=4$). Any other number of desired applications is conceivable.

In the first embodiment a measure of length was employed as the property. This is, however, not inevitably necessary. Any other measure suited for the object, or any combination of suitable measures may be used.

It is one outstanding feature of the method according to the invention that it discerns in accordance with a degree of fractality of the provided traverse characterising an object or pattern. In addition, not only a single dimension for fractality of the object is employed in this classification, but an entire set of numbers, i.e. the above mentioned vector having k components.

In FIGS. 3(a) and 3(b) two different patterns to be classified are represented. Herein the pattern of FIG. 3(a) is comparatively "more fractal" than the pattern of FIG. 3(b). The result of performing the method described according to the first embodiment on these patterns is shown in FIGS. 4(a) and 4(b), with the signature of FIG. 4(a) relating to the pattern of FIG. 3(a) and the signature of FIG. 4(b) relating to the pattern of FIG. 3(b). FIGS. 4(a) and 4(b) thus clearly demonstrate that the above method discerns very well between regular or smooth and irregular or fractal structures.

In the following a second embodiment of the present invention will be described.

In the second embodiment of the present invention, again a two-dimensional pattern is employed for purposes of simplification. Just like in the first embodiment, a two-dimensional traverse is generated for this two-dimensional pattern.

Figure 5:
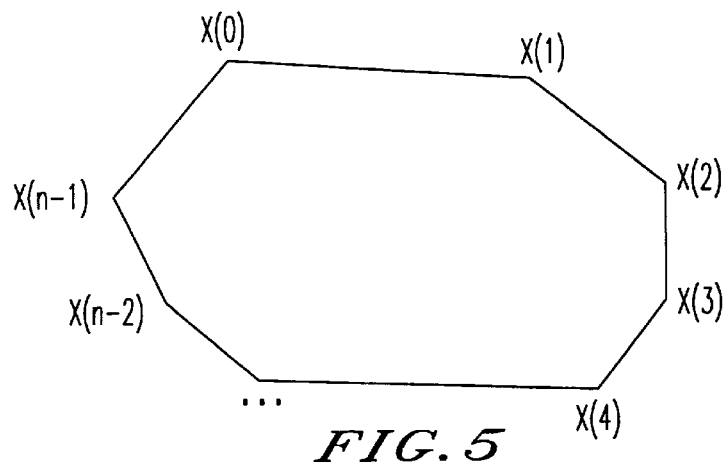
FIG. 5 shows a traverse to elucidate the manner of functioning of a method in accordance with a second embodiment of the present invention.
Figure 6:
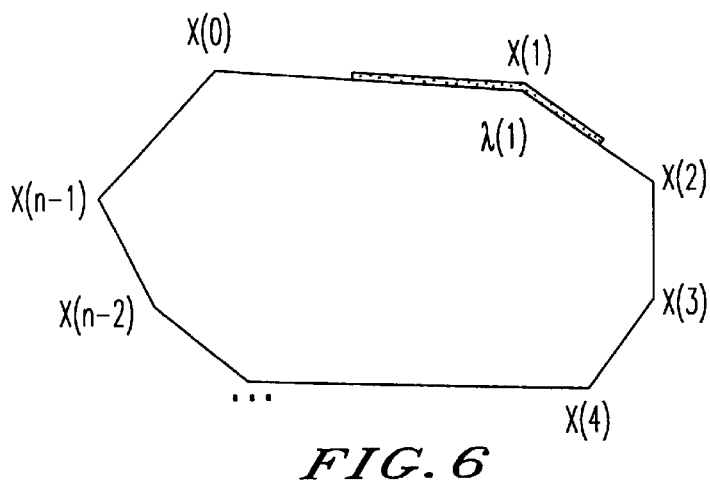
FIG. 6 shows a first alternative of acquiring a property of a respective point on the traverse in accordance with the second embodiment of the present invention.

FIG. 5 represents the traverse employed in the second embodiment. This traverse includes the number n of points x(0) to x(n-1). FIG. 6 shows a first alternative of acquiring a property of a respective point of the traverse. In this acquisition, every respective point of the traverse is assigned the Euclidean length. This means that every point x(i) is assigned half the distance from its predecessor x(i-1) and half the distance from its successor x(i+1). This assignment is expressed by the following equation (2):

$$\lambda(i,x(i))=\tfrac{1}{2}\{|x(i+1)-x(i)|+|x(i)-x(i-1)|\} \quad (2)$$

wherein $\lambda(i,x(i))$ represents the property or measure of point x(i) ($0 \leq i \leq n$).

Figure 7:
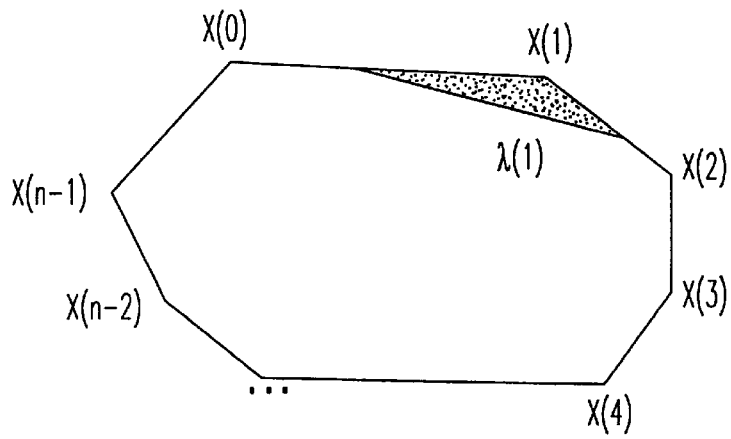
FIG. 7 shows a second alternative of acquiring a property of a respective point on the traverse in accordance with the second embodiment of the present invention.

Other alternatives of acquiring a property for every respective point on the traverse may, however, also be applied. One of these alternatives is represented in FIG. 7, in which case one employs the square root of the area of the triangle formed by point x(i) and its neighboring points x(i−1) and x(i+1) in a suitable manner. This can be expressed by the following equation (3):

$$\lambda(i, x(i)) = \sqrt{\frac{1}{2}|(x(i+1) - x(i)) \times (x(i) - x(i-1))|} \quad (3)$$

In this equation (3), the symbol × between the bracket relations represents the cartesian product.

In the method of the invention, however, most variegated methods which meet the following criteria may be employed for acquiring the property of every respective point.

The property or measure $\lambda(i,x(i))$ of every respective point of the traverse may unambiguously be calculated from the point x(i) and its neighboring points x(i−1) and x(i+1). Herein the properties or measures $\lambda(i,x(i))$ for non-identical points x(i−1), x(i) and x(i+1) are positive, as can be seen e.g. from FIGS. 6 and 7.

In case the method should be capable of recognizing similarity of patterns which merely differ in the quantity of the property to be similar, then the condition $\lambda(i,a*x(i)) = a*\lambda(i,x(i))$ applies, with a representing a multiplication constant.

In case the method should furthermore be capable of recognizing patterns which differ in other characteristics than quantity of the property to be similar, then corresponding conditions herefor must be derived. In many applications it may, for example, be desired for the absolute position in m-dimensional space to be irrelevant. This condition may be taken into account by using the condition expressed in equation (2). In general terms this refers to employing the condition that the property $\lambda(i,x(i))$ merely depends on |x(i+1)−x(i)| and |x(i)−x(i+1)|.

Various such demands or conditions may be realized by means of the method of the invention, It might, for instance, be desired, apart from the latter condition of disregarding the absolute position of the pattern in m-dimensional space, i.e. therefore a shift or translation, to recognize similarity of patterns which are merely rotated relative to each other, i.e. there is a possibility of superposition by rotating the patterns in m-dimensional space. This possibility, too, may i.a. be ensured by a suitable condition.

Finally any conceivable combination of conditions, as e.g. mentioned above, is applicable in this method, whereby the method of the invention is applicable to any desired type of pattern to be classified and recognized and any pattern is classifiable by means of a desired number of features of every respective point.

Like in the first embodiment of the present invention, following acquisition of all the properties for every respective point these properties are linked in order to obtain an overall property characterising the traverse. Linking of this type may e.g. be the one represented in equation (4)

$$\Lambda(a, b) = \frac{1}{2}\{\lambda(a, x(a)) + \lambda(b, x(b))\} + \sum_{i=a+1}^{b-1} \lambda(i, x(i)) \quad (4)$$

wherein $\Lambda(a,b)$ represents the value of a distance between points a and b on the traverse.

If the points on the traverse are expressed as an ordered set of points M={x(0), . . . , x(n−1)}, then the resulting overall property of the traverse by using the above equation (4), wherein a=0 and b=n−1, is as follows:

$$\Lambda(\{M\}) = \Lambda(0, n-1) \quad (5)$$

In case the method, as was mentioned above, should e.g. be capable of recognizing similarity of patterns differing in size only, then subsequently all the single co-ordinates of the points of the ordered set M are re-scaled or normalized by means of the overall property of the traverse, as is represented in the following equation (6):

$$\{x(0), \ldots, x(n-1)\} \rightarrow \{x(0)/\Lambda, \ldots, x(n-1)/\Lambda\} \quad (6)$$

Subsequently, as in the first embodiment, smoothing of the traverse is performed. In this second embodiment, smoothing is performed by applying an averaging which is dependent on a scale parameter $\Delta$ ($\Delta>0$). This scale parameter represents the range of averaging on the path through the ordered set of points M. Moreover the averaging method is dependent on the previously acquired measures or properties $\{\lambda(0), \ldots, \lambda(n-1)\}$ on the traverse. The averaging method employed in this second embodiment is represented in the following equation (7):

$$x'(i) = \frac{\left\{\sum_{j=i-\frac{n}{2}}^{i} x(j) * p(\Lambda(i, j), \Delta) + \sum_{j=i}^{i+\frac{n}{2}} x(j) * p(\Lambda(i, j), \Delta)\right\}}{\left\{\sum_{j=i-\frac{n}{2}}^{i} p(\Lambda(i, j), \Delta) + \sum_{j=i}^{i+\frac{n}{2}} p(\Lambda(i, j), \Delta)\right\}} \quad (7)$$

In the above equation (7), x'(i) represents the point on the new traverse which was derived from point x(i) on the original traverse, with i in equation (7) running from 0 to n−1 representing the number of points of the traverse. The term $p(\Lambda(i,j),\Delta)$ in equation (7) represents a weighting function. Thus in accordance with this second embodiment the ordered set of points M'={x'(0), . . . , x'(i), . . . , x'(n−1)}, i.e. the new smoothed traverse, is determined, with every point x'(i) of the new smoothed traverse being obtained from the co-ordinates x(i−1), x(i), x(i+1) of the points of the original traverse. Owing to the weighting function $p(\Lambda(i,j), \Delta)$ the point x'(i) of the set of points M' eventually represents a normalized and averaged sum of points x(i) on the original traverse and its neighboring points x(i−1), x(i+1).

Figure 9:
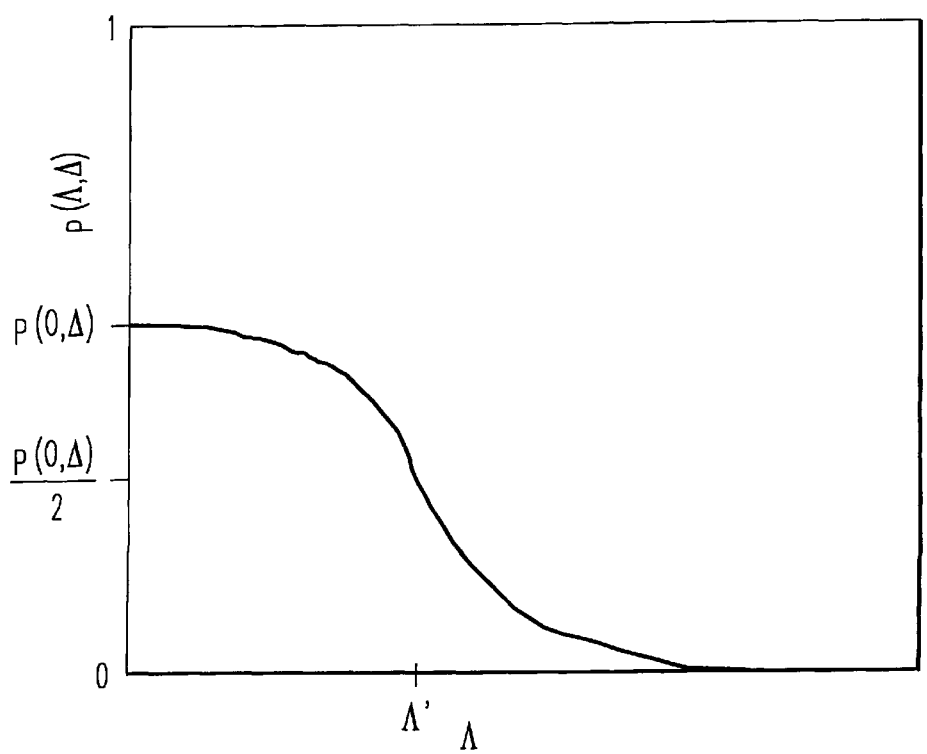
FIG. 9 is a representation of a weighting function employed in smoothing the traverse in accordance with the second embodiment of the present invention.

The essential properties of this weighting function $p(\Lambda i,j),\Delta)$ are described by referring to FIG. 9. The weighting function $p(L(i,j),\Delta)$ has a maximum at measure $\Lambda=0$, it steadily drops toward Zero for increasing measures $\Lambda$, and the value $\Lambda'$, to which applies $p(\Lambda',\Delta)=p(0,\Delta)/2$, increase for increasing scale parameters $\Delta$.

Figure 8:
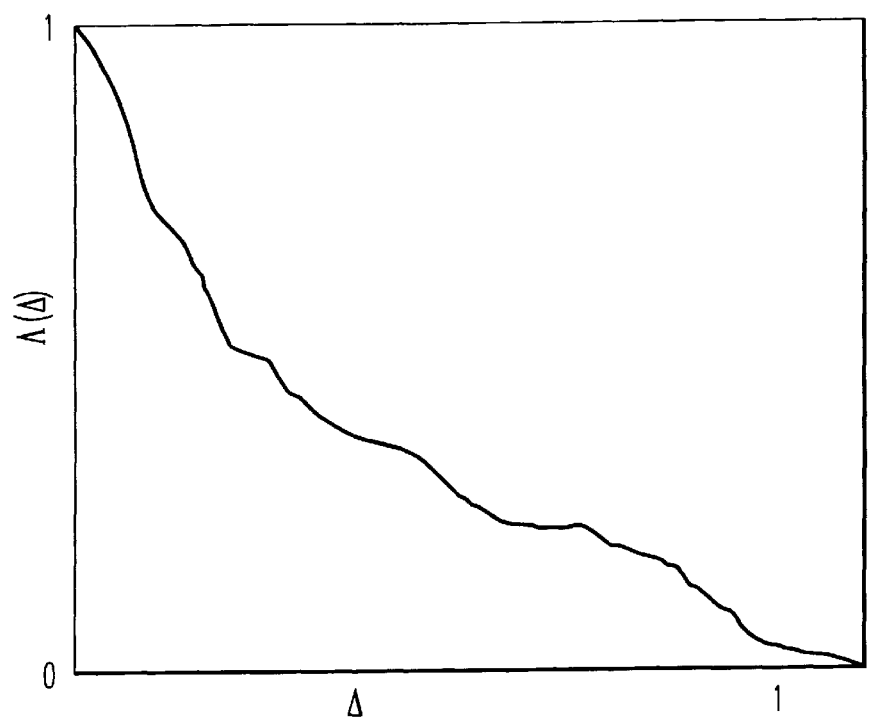
FIG. 8 shows dependency of a measure of an overall property of the traverse on a scale parameter in accordance with the second embodiment of the present invention.

Following smoothing of the original traverse and thereby obtaining the new traverse, the method steps from acquisition of a property or measure for the traverse are repeated (k−1) times for the new traverse to thereby attain k overall properties or measures. As is shown in FIG. 8, the overall measure of the points of the new traverse herein depends on the employed scale parameter $\Delta$, with the scale parameter $\Delta$ being different from each pass of the method. I.e., the pattern is eventually characterized by a number of k overall measures, thus characterized by a vector having k components, with the k overall measures or components of the vector consequently representing scale-dependent overall measures of the respective averaged set of points M'.

Finally the degree of similarity of the compared patterns can be determined by comparing the vector of the k overall measures representing the signature of the pattern to be classified and recognized with signatures of known patterns.

As can be learned from comparison of the first and second embodiments, the method is applicable to open traverse as well as closed traverses or polygons. If closed traverses are used, then the index of a point on the traverse always has to be taken modulo the number of points on the traverse. Where an open traverse is present as in the first embodiment, it may easily be transformed into a closed traverse by returning from one end of the traverse. As a result, the n points of the originally open traverse become ($n'=n+n-2$) points of the new closed traverse, as is shown below by equation (8):

$$\{x(0), x(1), \ldots, x(n-2), x(n-1), x(n-2), \ldots, x(1)\} \quad (8)$$

An advantageous development of the method according to the invention furthermore consists in the fact that instead of "sharply" defined measures for the vectors of known patterns, "fuzzy" sets are utilized whose distribution may be learned by the pattern recognition method. It is thereby possible to significantly increase the probability of recognition.

A practical application of the method of the invention, wherein pattern recognition at low computing speed (for fractal patterns as well) is desirable, e.g. consists of cost-saving yet exceedingly safe access control wherein merely a commercially available data processing means (personal computer) and a digitizing tablet for hand-written symbol input are required.

The shapes and temproal creation processes of these input symbols define patterns (traverse in m-dimensional space) whereby the user can unambiguously be identified. Generalization of the traditional password to these patterns has the decisive advantage that access cannot be effected solely through knowledge of the shape.

This method is moreover not tied in with country-specific symbols as merely patterns, but not semantic contents are examined. The variety of patterns in time and space furthermore permits the omission of other access control mechanisms (such as chip cards or magnetic cards) inasmuch as it is difficult to safeguard against their loss.

What is claimed is:

1. A method for classifying and recognizing patterns, comprising the following steps:
   (a) producing a pattern to be classified and recognized of an m-dimensional object, said object to be classified and recognized being provided in the form of an m-dimensional traverse, m being an integer greater than or equal to 1;
   (b) acquiring a property represented by an s-dimensional value for selected points of said traverse, whereby said s-dimensional value reflects a relationship between a respective selected point and a point preceding it and a point succeeding it on said traverse;
   (c) linking said s-dimensional value for said selected points of said traverse in such a manner than an overall property represented by a q-dimensional value characterizing said traverse is obtained;
   (d) smoothing said traverse in order to form a new traverse;
   (e) (k−1) times repeating steps (b) to (d), wherein k is an integer, to thereby obtain k overall properties from the repetition of step (c);
   (f) generating a q×k-dimensional matrix for said pattern by utilizing said k overall properties; and
   (g) comparing said q×k-dimensional matrix of said pattern to matrices of known patterns for ascertaining a degree of similarity of compared matrices.

2. The method according to claim 1, wherein said overall r-dimensional vectors obtained in step (c) are normalized by means of said overall property obtained in the first pass by step (c).

3. The method according to claim 2, wherein said linking performed in step (c) is in addition of said properties for said selected points of said traverse.

4. Method according to claim 3, wherein said acquired property is a length, and said k overall properties are k overall lengths of said respective traverse.

5. Method according to claim 4, wherein said lengths are Euclidean lengths of segments of said traverse.

6. The method according to claim 5, wherein step (d) of smoothing said traverse is performed such that each respective point of said new traverse is determined by a functional relationship which determines each respective point of said new traverse on the basis of a corresponding point of said previous traverse, at least a point preceding said corresponding point and at least a point succeeding said corresponding point on said previous traverse.

7. The method according to claim 6, wherein smoothing is performed such that averaging of each respective point of said new traverse is performed in accordance with an averaging range on said previous traverse.

8. The method according to claim 7, wherein in step (c) said averaging is performed by employing different averaging ranges for each repetition as defined in step (e).

9. The method according to claim 8, wherein said averaging includes a weighted functional relationship such that each respective point of said new traverse represents a weighted sum of a corresponding point of said previous traverse, at least a point preceding said corresponding point, and at least a point succeeding said corresponding point on said previous traverse.

10. The method according to claim 9, wherein in order to increase probability of recognition, said matrices of known patterns have a fuzzy distribution which is recognized by said method.

11. The method according to claim 1, wherein said selected points of said traverse are corner points of said traverse.

12. The method according to claim 1, wherein said selected points are corner points and end points of said traverse.

13. Method according to claim 1, wherein said selected points are end points of said traverse.

14. A method for classifying and recognizing patterns, comprising the following steps:
   (a) producing a pattern to be classified and recognised of an m-dimensional object, said object to be classified and recognized being provided in the form of an m-dimensional traverse;
   (b) acquiring a property of selected points of said traverse, whereby said property is defined such that it unambiguously reflects a relationship between a respective selected point and a point preceding it and a point succeeding it on said traverse;
   (c) linking said properties for said selected points of said traverse in such a manner that an overall property unambiguosly characterizing said traverse is obtained;
   (d) smoothing said traverse in order to form a new traverse;

(e) (k−1) times repeating steps (b) to (d), wherein k is an integer, to thereby obtain k overall properties from the repetition of step (c);

(f) generating a signature for said pattern by utilizing said k overall properties; and (g) comparing said signature of said pattern to signatures of known patterns for ascertaining a degree of similarity of compared signatures, wherein said acquired property is a length corresponding to a half distance from the point preceding it and a half distance from the point succeeding it, and said k overall properties are k overall lengths of said respective traverse.

* * * * *

UNITED STATES PATENT AND TRADEMARK OFFICE
CERTIFICATE OF CORRECTION

PATENT NO. : 6,229,920 B1
DATED : May 8, 2001
INVENTOR(S) : Schmidt

It is certified that error appears in the above-identified patent and that said Letters Patent is hereby corrected as shown below:

<u>Title page,</u>
Item [73] is incorrect. Item [73] should read,
-- Item [73] Assignee: Delphi 2 Creative Technologies GmbH, Munich (DE) --

Signed and Sealed this

Second Day of October, 2001

Attest:

*Nicholas P. Godici*

NICHOLAS P. GODICI
*Acting Director of the United States Patent and Trademark Office*

*Attesting Officer*